US010793241B2

(12) United States Patent
Guevel et al.

(10) Patent No.: US 10,793,241 B2
(45) Date of Patent: Oct. 6, 2020

(54) METHOD AND SYSTEM FOR LAUNCHING AND RECOVERING UNDERWATER VEHICLES WITH AN AUTONOMOUS BASE

(71) Applicant: CGG SERVICES SAS, Massy (FR)

(72) Inventors: Christophe Guevel, Massy (FR); Pierrick Daniel, Longjumeau (FR)

(73) Assignee: CGG SERVICES SAS, Massy (FR)

( * ) Notice: Subject to any disclaimer, the term of this patent is extended or adjusted under 35 U.S.C. 154(b) by 318 days.

(21) Appl. No.: 15/920,559

(22) Filed: Mar. 14, 2018

(65) Prior Publication Data
US 2019/0283848 A1 Sep. 19, 2019

(51) Int. Cl.
*B63G 8/00* (2006.01)
*B63G 8/16* (2006.01)
*B63G 8/22* (2006.01)
*B63G 8/24* (2006.01)

(52) U.S. Cl.
CPC .......... *B63G 8/001* (2013.01); *B63G 8/16* (2013.01); *B63G 8/22* (2013.01); *B63G 8/24* (2013.01); *B63G 2008/004* (2013.01); *B63G 2008/008* (2013.01)

(58) Field of Classification Search
CPC .... B63G 8/001; B63G 8/16; B63G 2008/004; B63G 2008/008
See application file for complete search history.

(56) References Cited

U.S. PATENT DOCUMENTS

| 7,632,043 | B2* | 12/2009 | Thompson | B63C 11/40 |
| | | | | 181/110 |
| 8,534,959 | B2* | 9/2013 | Thompson | B63G 8/001 |
| | | | | 405/209 |
| 9,321,514 | B2* | 4/2016 | Lelaurin | B63G 8/001 |
| 9,381,980 | B1* | 7/2016 | Rush, III | B63G 8/22 |
| 9,469,382 | B2 | 10/2016 | Lelaurin et al. | |
| 9,758,224 | B2* | 9/2017 | Ryuh | B63G 8/001 |
| 10,011,336 | B2* | 7/2018 | Bhattacharyya | B63G 8/001 |
| 10,093,402 | B2* | 10/2018 | Korneliussen | B63G 8/001 |
| 10,526,062 | B2* | 1/2020 | Merchant | B63G 8/001 |
| 2018/0319463 | A1* | 11/2018 | Grant | B63G 8/001 |

* cited by examiner

*Primary Examiner* — Todd Melton
(74) *Attorney, Agent, or Firm* — Patent Portfolio Builders PLLC (57) ABSTRACT

An autonomous underwater base for handling an autonomous underwater vehicle (AUV) equipped with seismic sensors for recording seismic signals during a marine seismic survey. The autonomous underwater base includes a storing module configured to store the AUV; an inlet/outlet module configured to control access of the AUV to the storing module; and a control module having a positioning system configured to adjust a position of the base in water. The positioning system autonomously drives the storing module from a first position to a second position underwater.

20 Claims, 10 Drawing Sheets

METHOD AND SYSTEM FOR LAUNCHING AND RECOVERING UNDERWATER VEHICLES WITH AN AUTONOMOUS BASE

BACKGROUND

Technical Field

Embodiments of the subject matter disclosed herein generally relate to methods and systems and, more particularly, to mechanisms and techniques for launching and recovering autonomous underwater vehicles (AUVs) that carry appropriate seismic sensors for performing a seismic survey.

Discussion of the Background

Marine seismic data acquisition and processing generate a profile (image) of a geophysical structure beneath the seafloor. While this profile does not provide an accurate location of oil and gas reservoirs, it suggests, to those trained in the field, the presence or absence of these reservoirs. Thus, providing a high-resolution image of the geophysical structures under the seafloor is an ongoing process.

Reflection seismology is a method of geophysical exploration to determine the properties of earth's subsurface, which is especially helpful in the oil and gas industry. Marine reflection seismology uses a controlled source of energy that sends the energy into the earth. By measuring the time it takes for the reflections to come back to plural receivers, it is possible to evaluate the depth of features causing such reflections. These features may be associated with subterranean hydrocarbon deposits.

Traditionally, the source of energy and seismic receivers are towed by a large vessel during a seismic survey. However, this system is expensive and difficult to maneuver, especially in high seas. Thus, swarms of AUVs are considered to change the operation methods and take advantage of the scalability and the flexibility offered by the swarms configuration.

One of the challenges of the swarms of AUVs is the launching and recovery operations, which involve handling many individual AUVs without wasting time and without losing any AUV. If the launch can be done on a large scale from the vessel deck, the recovery of a large number of AUVs is more problematic.

Figure 1:
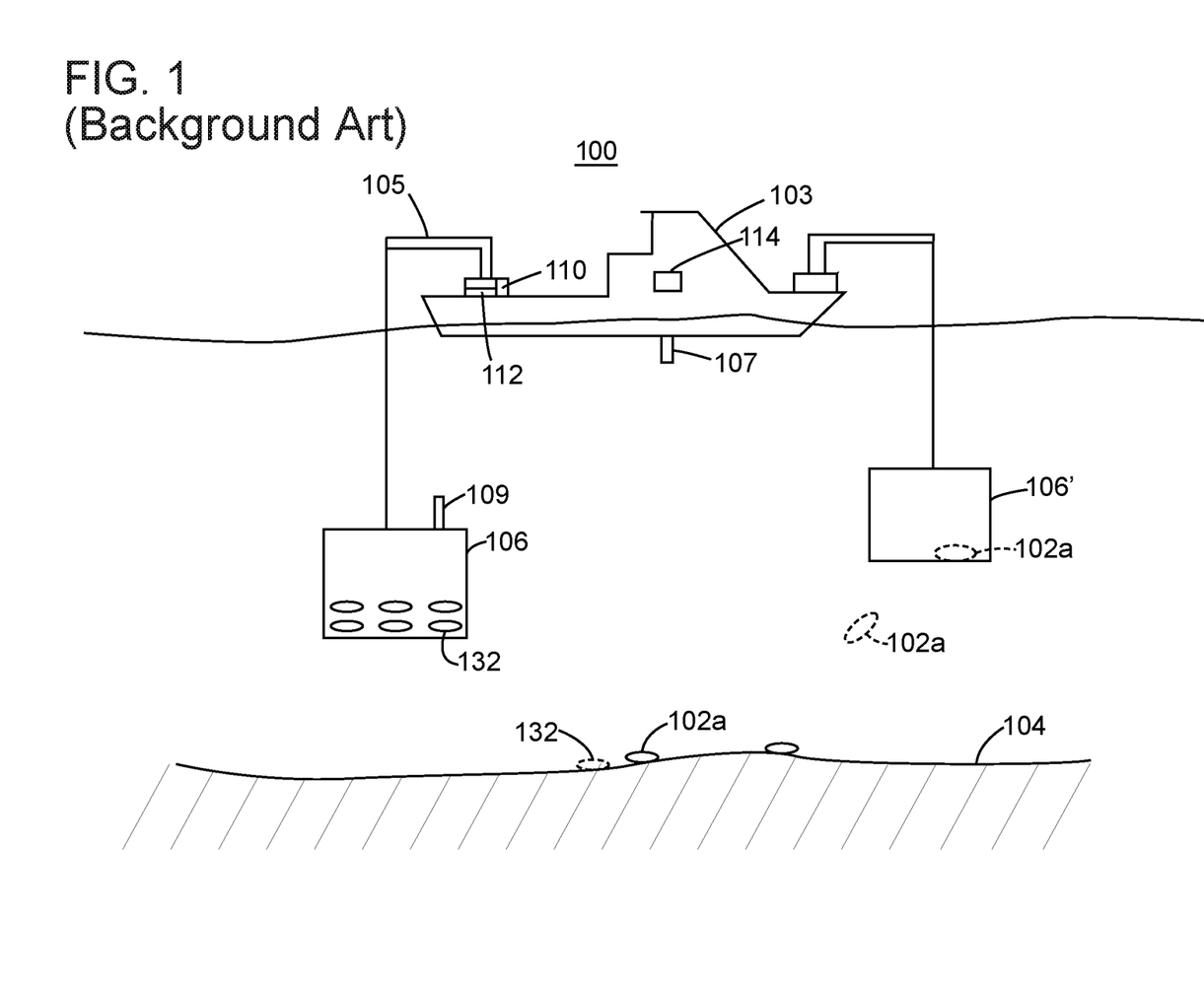
FIG. 1 is a schematic diagram of a conventional seismic survey system.

U.S. Pat. No. 9,469,382 (the '382 patent herein), which belongs to the assignee of this application, has introduced a recovery basket for recovering the AUVs. More specifically, as shown in FIG. 1, which corresponds to FIG. 7 of the '382 patent, a seismic survey system 100 includes a vessel 103 that, with the help of a crane 105, deploys an underwater base (e.g., a cage) 106 underwater and maintains the cage at a given underwater position described by coordinates (x,y, z). To achieve this condition, crane 105 may have a controller 110 that coordinates a heave mechanism 112 for maintaining the given position (x,y,z), despite the normal movement of vessel 103. Note that the given position (x,y,z) may be on or above the ocean bottom. In one application, controller 110 is part of a global controller 114 associated with the vessel's navigation system.

Underwater base 106 accommodates one or more AUVs 132 that are deployed when necessary to replace existing AUVs 102a already located on or above the ocean bottom 104, being stationary or drifting in a free or guided manner. AUVs 102a's positions are known because either vessel 103 has used its detection system 107 (e.g., USBL) to determine those positions, or underwater base 106 has used a similar detection system 109, or AUVs 102a have calculated (e.g., using an INS system) their landing positions and have transmitted this information, e.g., using an acoustic modem, to underwater base 106 or vessel 103. Alternatively, the AUVs positions are known prior to deploying them because they have been pre-plotted.

The system discussed with regard to FIG. 1 may include two underwater bases, a launching base 106 and a recovery base 106', both connected to a corresponding crane. With this configuration, launching base 106 launches fresh AUVs 132, and the already deployed AUVs 102a do not return to the launching base 106, but rather to the recovery base 106'.

For this system, there is always a mechanical link between the base (cage) that holds the AUVs and the crane. However, this system may have the following potential problems. When the currents and sea state become large, the vessel and basket motions increase the operational risks. The vessel drifts with the surface currents and the submerged basket moves away from the given position. Because of the currents, the crane is not capable to maintain the base at the given position, and the cable is at risk to go out of the sheave. To compensate for this effect, a highly efficient dynamically positioned (DP) vessel is required, which is not easy to find on the market, and is also expensive.

If a simple crane is used, the vessel pitch and roll motions due to the heave is transmitted to the crane and the basket, and consequently, when the base is in the air, the base can hit the vessel's side or equipment, and/or the operators on deck or at sea, which poses a strong safety risk, especially with a short crane arm. When in the water, the base moves up and down, following the cable motions due to vessel motions, causing a difficult entrance for the AUVs.

Therefore, the base has to be managed at minimum by a heave compensated crane. However, this type of cranes is not so common, especially when the desire is to implement the swarm system aboard a vessel of opportunity. Further, this kind of crane is not easy to install on these vessels (long approval process by maritime classification societies, and reinforcements of the vessel structure sometimes required). Moreover, the crane has to be coupled with a DP vessel as discussed above.

Further, even with these compensation means, if the vessel operates in sea state 4 or higher, the vessel motions will be difficult to control, and the permanent link with the base can present a risk to the AUVs recovery operations.

Accordingly, it would be desirable to provide systems and methods that provide an inexpensive and efficient method for deploying and retrieving AUVs.

SUMMARY

According to an embodiment, there is an autonomous underwater base for handling an autonomous underwater vehicle (AUV) equipped with seismic sensors for recording seismic signals during a marine seismic survey. The autonomous underwater base includes a storing module configured to store the AUV, an inlet/outlet module configured to control access of the AUV to the storing module, and a control module having a positioning system configured to adjust a position of the base in water. The positioning system autonomously drives the storing module from a first position to a second position underwater.

According to another embodiment, there is an autonomous underwater base for deploying/retrieving an autonomous underwater vehicle (AUV). The autonomous underwater base includes a body, a positioning system formed within the body and configured to adjust a position of the base in water, and a controller connected to the positioning system and configured to control the positioning system. The positioning system autonomously drives the base from a first position to a second position underwater.

According to still another embodiment, there is a method for launching/retrieving an autonomous underwater vehicle (AUV) equipped with seismic sensors for collecting seismic data. The method includes downloading an underwater position to an autonomous base while on board of a vessel, lowering the autonomous base at a first position in water, from the vessel, and disconnecting the autonomous base from the vessel so that there is no mechanical link between the autonomous base and the vessel, autonomously driving the autonomous base from the first position to a second position, launching or retrieving the AUV at the autonomous base at the second position, and autonomously returning the autonomous base to a water surface.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of an AUV having seismic sensors for recording seismic waves. Note that an AUV in the following description is considered to encompass an autonomous self-propelled node that has one or more sensors capable of detecting seismic waves.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures, or characteristics may be combined in any suitable manner in one or more embodiments.

According to an embodiment, a seismic system includes plural AUVs, each having one or more seismic sensors. The seismic sensors may include a hydrophone, geophone, accelerometer, electromagnetic sensor, depth sensor, or a combination thereof. For improving the detection and decrease the noise, the AUVs are preferably actuated through jet pumps. In this regard, note that standard actuators, like thrusters, normally emit noise in the seismic bandwidth (5-125 Hz) when they are activated, even if they are rotating at a higher speed. This noise can significantly reduce the signal-to-noise ratio, or even completely jam the seismic signal, which is undesirable.

Thus, in one embodiment, the AUV is actuated by centrifugal jet pumps instead of standard thrusters. The jet pump, contrary to the standard thrusters, sucks a small amount of water at its inlet, accelerates this small amount of water with an impeller which is actuated by an electrical motor, and ejects the small amount of water at high speed through its outlet, which generates the thrust force.

Because the impeller rotates at a very high speed (more than 1,000 RPM), most of the generated noise is at a frequency higher than the seismic bandwidth upper limit, e.g., below −60 dB in the bandwidth of 5-200 Hz. Many configurations of AUV actuation are possible, for example, with different number of jet pumps in different positions, depending on the number of degrees of freedom (DoF) requested for the AUV.

For deploying and collecting the AUVs, an autonomous base is used. The base is deployed in water with a crane, after which the base is detached from the crane. Alternatively, the base remains connected to the crane with a link which becomes lose: the base uses its own propulsion means to maintain its position and/or depth, but remains coupled to the vessel. The base has its own means to float at a desired depth and also to maintain that depth even in the presence of ocean currents. Further, the base has its own means to move in a plane substantially parallel to the water surface. Thus, an "autonomous base" is understood herein to be a base that is capable of navigating by itself from a first position $x_0$, $y_0$, $z_0$ to a second position x, y, z and also that is capable of storing plural AUVs. Further, the base has no arm or crane for grabbing the AUVs. The base is also small enough so that a crane on a vessel is capable to lift the base from water and to bring it on the vessel's deck. After the AUVs are launched or recovered from the base, the base moves on its own toward the water surface to connect to a cable of the crane. After the connection is achieved, the crane brings the base from water to the vessel's deck.

In this way, any crane present on the vessel can quickly and safely launch the base in water. The base can disconnect from the crane to make the base autonomous during the AUVs launch and recovery phases, and the base is able to navigate autonomously (controlled by a local controller or being remotely operated) from the vessel to a given position (in the vessel vicinity), communicate with the control and command system aboard the vessel (to control its position and navigation), dive autonomously to a depth where the surface swell effects are strongly attenuated (typically below 20 m depth), stay there during the AUVs launch/recovery, offer guidance capabilities to the AUVs entrance and storage, navigate up to surface autonomously (or remotely operated), and navigate back autonomously (or remotely operated) to the vessel. An ordinary crane, A-Frame, or other hoisting means (like FRC davit, which is a fast rescue craft for launch and recovery, known in the art) may be used to catch and recover, quickly and safely, the base and bring it on deck (up to sea state 6).

One or more of the embodiments discussed next present a system that may improve the safety for operators and equipment, may have less AUVs losses, may save operational time, and may enable the use of a vessel of opportunity. These embodiments are now discussed with regard to the figures.

Figure 2:
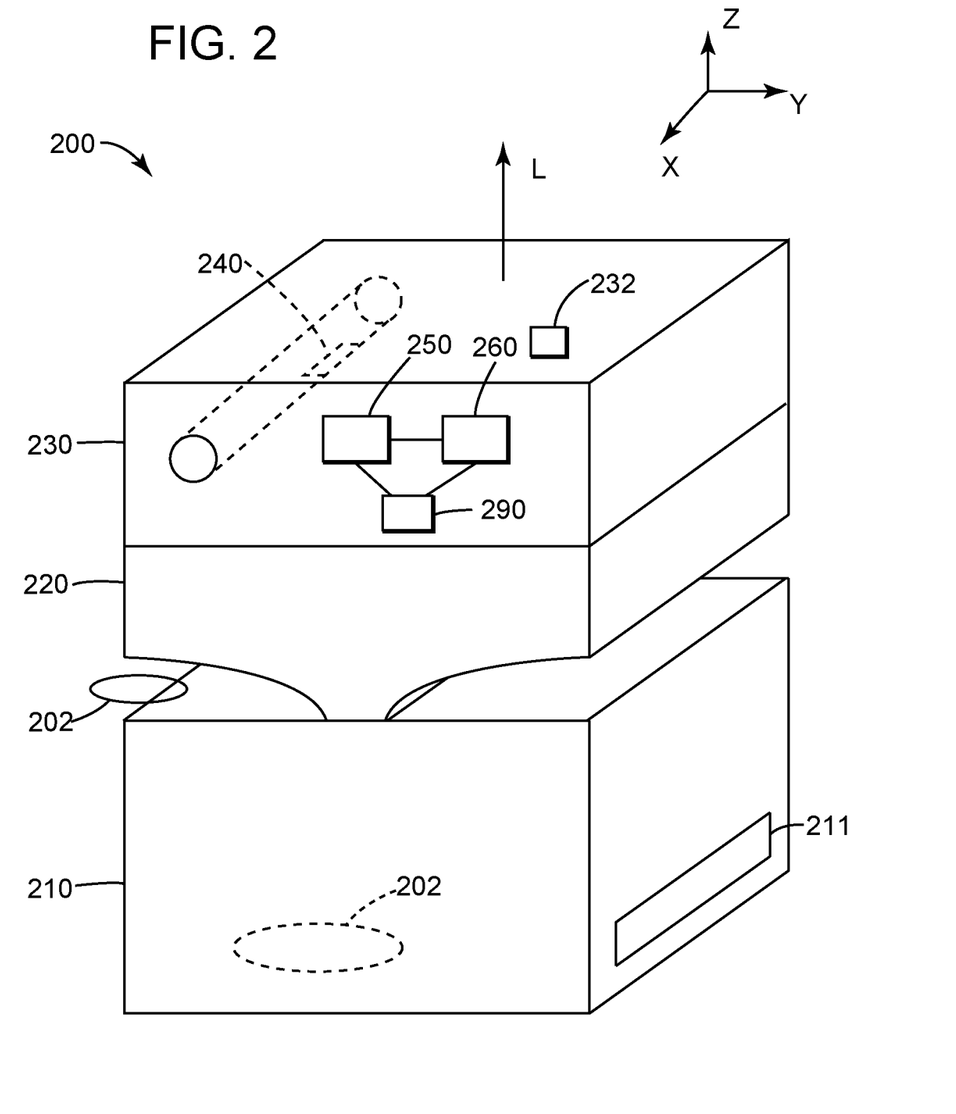
FIG. 2 illustrates an autonomous underwater base capable of launching/retrieving AUVs.

FIG. 2 illustrates an embodiment in which a base 200 has a storage module 210, an inlet/outlet module 220, and a control module 230. The storage module 210 is configured to store the AUVs and the inlet/outlet module 220 is configured to receive or release AUVs. The storage module 210 may have an outlet 211 through which the AUVs may be released if the same base 200 is used to launch and recover the AUVs. In one embodiment, the base 200 may be used to recover the AUVs and another base may be used to launch the AUVs. The another base may have a side that opens underwater for allowing the AUVs to be launched. Each base may be provided with the control module 230. The storage and inlet/outlet modules are discussed later in more detail. FIG. 2 also shows an AUV 202 being already inside the storage module 210 and another AUV 202 just entering the inlet/outlet module 220. Note that AUV 202 enters by itself through the inlet/outlet module 220, i.e., there is no mechanical link between the base and the AUV for launching or recovering the AUVs. Also note that FIG. 2 is a schematic that shows some elements of the base and one skilled in the art would know how to configure each module to launch or recover AUVs.

The control module 230 includes an acoustic system 232 for guiding the AUVs toward the inlet/outlet module 220 and/or toward their recording positions, a positioning system 240 that is capable of positioning the base at a desired depth and also for moving the base horizontally underwater, a power system 250 for supplying power to the various modules of the base, a controller 260 for controlling the various modules of the base, and a communication system 290 for communicating with the AUVs and/or vessel. Although FIG. 2 shows the control module 230 being placed on top of the inlet/outlet module 220, those skilled in the art would understand that the control module 230 may be placed anywhere on the base 200, for example, on the side or bottom of the storage module 210. Further, the control module 230 may be split into components and these components may be placed anywhere on the base 200.

Figure 3:
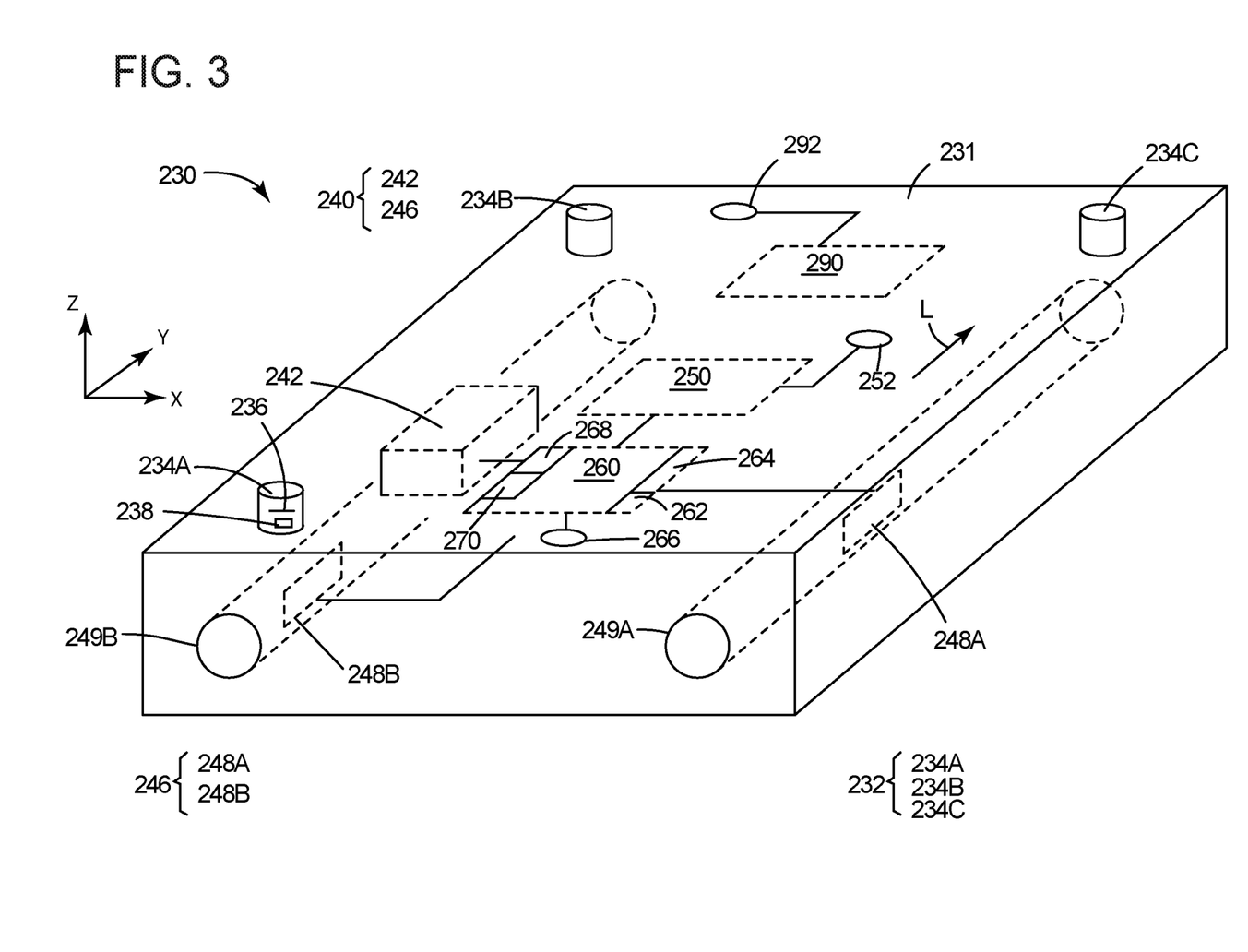
FIG. 3 illustrates a control module of an autonomous underwater base.
Figure 4:
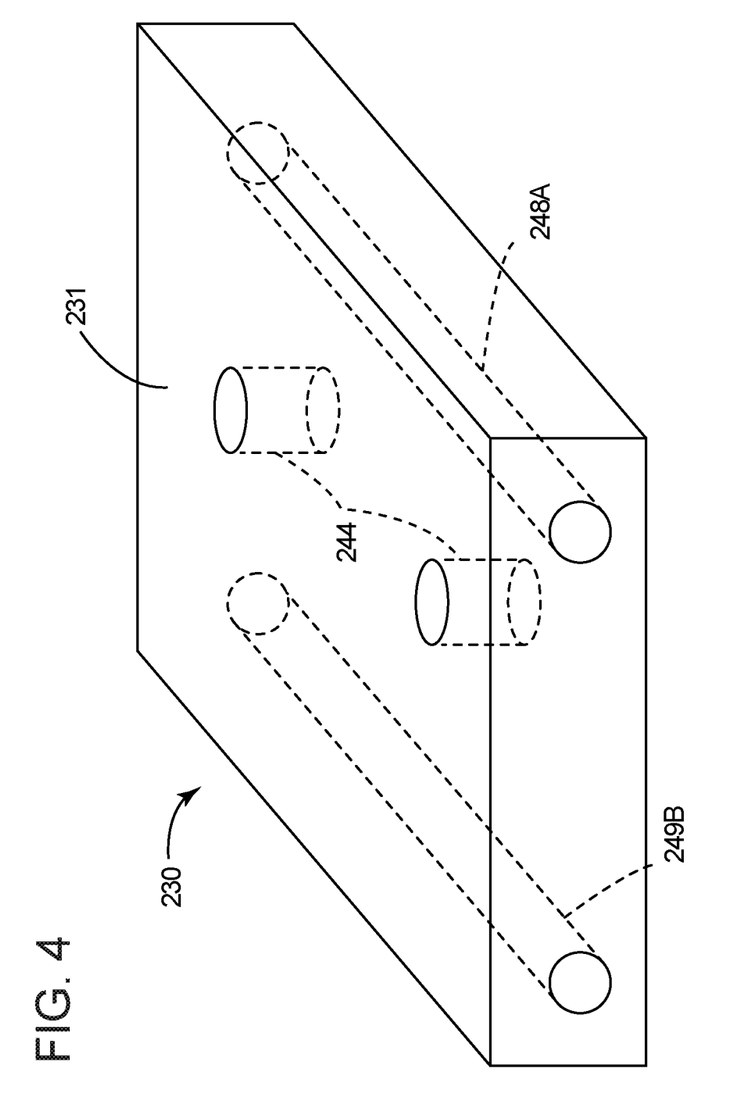
FIG. 4 illustrates another control module of an autonomous underwater base.

The control module 230 is shown in more detail in FIG. 3. A positioning system 240, which is part of the control module 230, includes a depth control mechanism 242 and a lateral positioning mechanism 246. Depth control mechanism 242 may be a ballast mechanism. A ballast mechanism may include an accumulator having an internal membrane that separates the accumulator into first and second chambers, and a source of compressed air that can increase a volume of the first chamber so that water in the second chamber is expelled, and thus a buoyancy of the accumulator can be adjusted, similar to a ballast mechanism in a submarine or to a buoyancy chamber in AUVs/ROVs. Alternatively, the ballast could be done with oil. Those skilled in the art would understand that other depth control mechanisms may be used, for example, one or more tunnel thrusters 244 as illustrated in FIG. 4.

The lateral positioning mechanism 246 may include one or more tunnel thrusters 248A and 248B, as illustrated in FIG. 3. A tunnel thruster 248A or 248B includes a propeller located in a corresponding tunnel 249A or 249B. A corresponding motor rotates each propeller. The controller 260 is connected to the tunnel thrusters and is programmed to independently control the tunnel thrusters so that the base can move in the XY plane that is parallel to the water surface. The controller 260 can also actuate the tunnel thrusters in opposite directions, so that the base can rotate relative to the gravity (Z axis). Note that the depth control mechanism 242 is also controlled by the controller 260 so that the base can move up or down along the Z axis.

The controller 260 may include a variety of elements, some of them illustrated in FIG. 3. A clock 262 (which may be a high-precision clock) is connected to a navigation device 264, and both the clock 262 and the navigation device 264 are connected to a power source 250 (e.g., a battery). Various other electronic components may also be provided in the controller, for example, to interface with storing mechanism 210 and inlet/outlet mechanism 220.

Navigation device 264 may include an inertial navigation system, an attitude and heading reference system (AHRS), or another similar device. Navigation device 264 is used for determining an accurate position and orientation of the underwater base. For example, after crane 105, illustrated in FIG. 1, deploys underwater base 200, the underwater base freely rotates while moving to its desired underwater position and also can change its X and Y coordinates. However, for guiding the AUVs to their new positions and for being able to recover the existing AUVs, the underwater base needs to know, as accurately as possible, its own absolute position. By knowing the original coordinates (i.e., when the underwater base is released into the water, the vessel's GPS is used to determine this position) of the underwater node and its trajectory (using the INS or AHRS or other dead reckoning method based on speed and heading sensor) while traveling underwater toward the desired position, the underwater base is capable of calculating its final x,y,z position, and also its orientation, e.g., an angle between (i) a longitudinal axis L associated with the body 231 of the base 200 and (ii) a reference axis or system of axes (e.g., X) as shown in FIG. 2. Note that the base could only be considered as a drifting object, with relative motion similar to ideal AUV when immersion depth is similar.

The desired x,y,z position of the base underwater and its orientation may also be determined by an acoustic device installed on the vessel, for example, USBL, and this information may be transmitted to the underwater base via an acoustic modem. For the purpose of exchanging this and other information (e.g., status of deployment/recovery, etc.) with the vessel while underwater, the base 200 may have a modem port 292, that is connected to communication system 290. A power port 252 may be provided on the body 231 for charging the power system 250 when the base is on the vessel's deck, or for connecting to an underwater device that has the capability to provide power. Controller 260 may also have a port 266 for synchronizing, when on the vessel's deck, the clock 262, downloading mission parameters, uploading data acquired during launch and recovery, etc. Controller 260 also includes a processor 268 and associated memory 270 for storing the base position and future path. The processor 268 is configured to calculate the position of the base based on information exchanged with the vessel and/or the position of the approaching AUVs.

Base 200 also includes an acoustic system 232 for providing guidance to departing and/or arriving AUVs. Acoustic system 232 may include three or more acoustic beacons 234A-C, for example, on top of the body 231 of base 200. These acoustic beacons may form a short base line (SBL) system. Other locations of the acoustic beacons on the underwater base are possible. Having more acoustic beacons is desirable so that during a seismic survey, or at least during outbound or inbound navigation (i.e., during short time periods when the base is used to launch or recover the AUVs; in one embodiment, the acoustic guidance system is provided by other elements and not by the base due to the fact that the base may be retrieved on the deck of the vessel after launching the AUVs), each AUV has a "direct view" of at least three acoustic beacons for positioning itself. In one application, at least two of the acoustic beacons are positioned within a base of a pyramid, while at least one of the acoustic beacons is positioned at the top of the pyramid. In this arrangement, each AUV has the capability to position itself not only in a horizontal, but also in a vertical plane relative to a reference plane of the base.

An acoustic beacon may include a ceramic element 236 that emits the acoustic signal and corresponding electronics 238 that interacts with the controller 260 and also controls the ceramic element.

In one application, a distance between two acoustic beacons may be in the order of meters, for example, 2.5 m. With such a configuration, it is expected that an AUV could detect its position from 1 km away, with a good precision, e.g., 1 m. As the technology improves, it is expected that these numbers will become even better. Controller 260 is programmed to select appropriate frequency channels for the acoustic beacons, to adjust the channels if necessary, to synchronize the acoustic beacons, and to exchange information with the acoustic beacons, e.g., to send commands to interrogate the AUVs. In one application, controller 260 is capable of interrogating the AUVs about their position and their status, instructing them to return to the underwater base, etc. Thus, acoustic system 232 may provide not only AUVs guidance functionality, but also AUVs communication, wired or wireless.

The communication between the base and the vessel and the base and the AUVs is handled by the communication module 290. The communication module 290 may include an acoustic modem, one or more GPS receivers, radio-frequency (RF) transceivers, optical transceivers, etc. The processor 268 is capable of communicating with the approaching AUVs and/or with the vessel via the communication system 290 and/or via the beacons 234A-C. In one embodiment, the path communication between the base and the vessel may be used by an operator located on the vessel to remotely control the position of the base. For example, after the base is released from the crane, the operator on the vessel may drive the base to the desired underwater location, while the base is not mechanically linked to the vessel. Should the base remain connected, the connecting (lifting) cable could be used for transmission.

Once at the desired location, the AUVs stored in the storage system 210 may be instructed to leave the base and proceed to their recording positions. If necessary, AUVs that have performed their recordings are instructed, either be the vessel or by the base, to move toward the base and enter the storage mechanism via the inlet/outlet mechanism. After the recovery operation of the AUVs is performed, the operator from the vessel may instruct the base to surface so that the crane can retrieve the base and park it on the vessel's deck. While all the operations discussed above have been performed by an operator of the vessel, by remotely controlling the base, in one embodiment is possible that the processor 268 of the base performs all these operations based on instructions stored in memory 270. In other words, it is possible to store in the memory 270 the instructions needed for launching the base, moving to the desired underwater position, releasing and/or retrieving the AUVs, and resurfacing for being brought back on the vessel.

Figure 5:
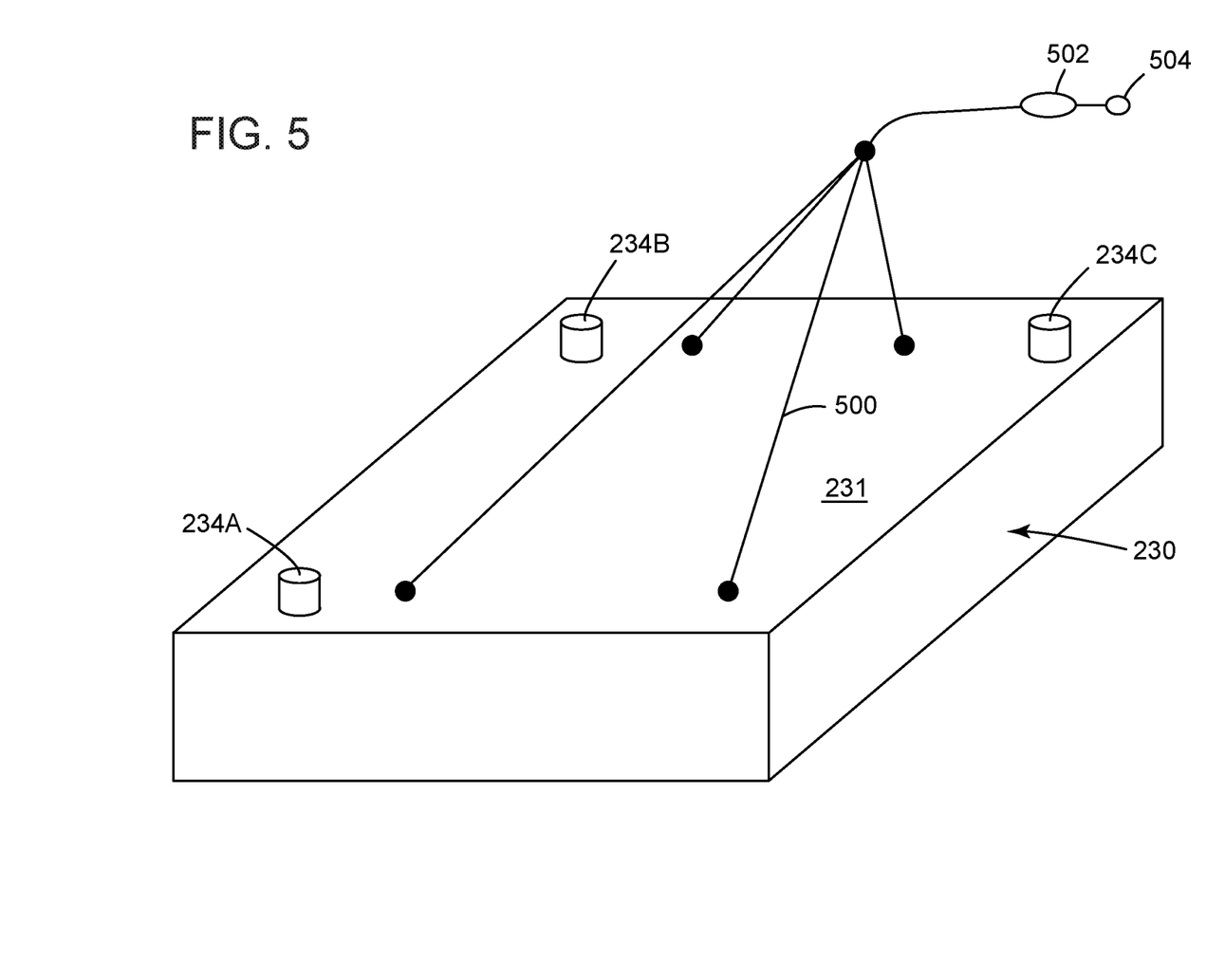
FIG. 5 illustrates a mechanism for attaching an autonomous underwater base to a crane.
Figure 6:
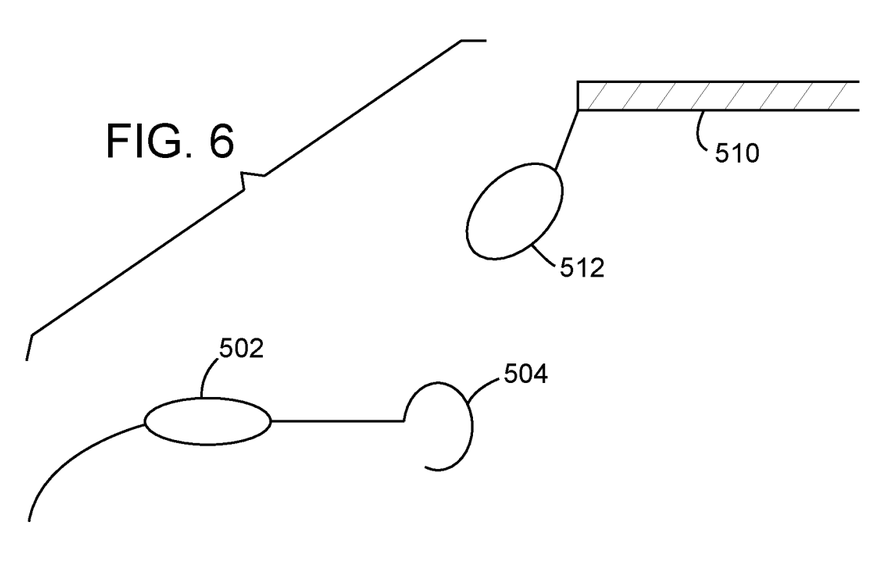
FIG. 6 illustrates another mechanism for attaching an autonomous underwater base to a crane.

To connect the crane from the vessel to the base, one or more ropes 500 may be attached to the body 231 of the control module 230, as illustrated in FIG. 5. The one or more ropes 500 are then connected to a float 502, that floats at the water surface when the base is surfacing. Attached to the float 502 may be a strong hook or a lasso type rope 504, which can be hooked to the crane. If element 504 is a hook, the crane 510 may be equipped with a lasso type rope 512 to connect to the hook 504, as shown in FIG. 6. Alternatively, if element 504 is a lasso, the crane may be equipped with a hook.

Figure 7A:
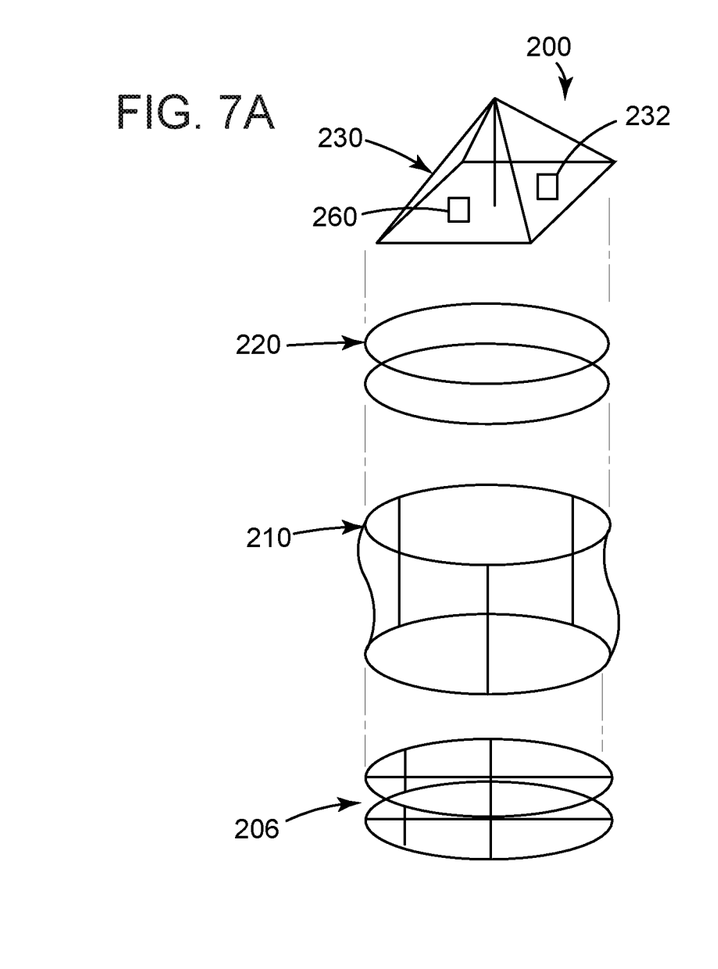
FIGS. 7A and 7B illustrate one possible implementation of an autonomous underwater base.
Figure 7B:
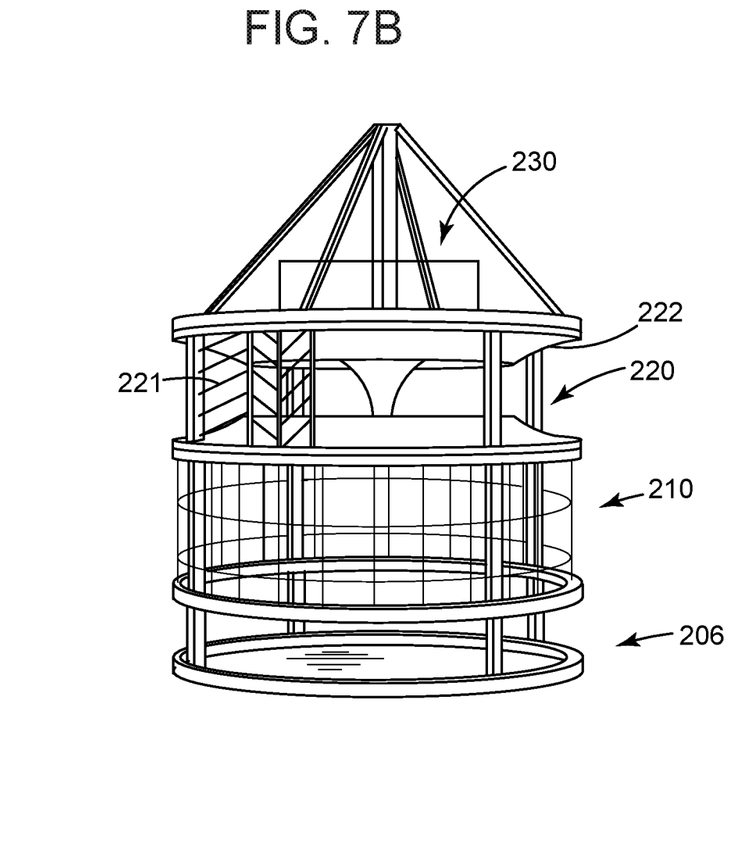

One possible configuration of the autonomous base 200 is now discussed with regard to FIGS. 7A and 7B. Autonomous base 200 may have a control module 230, an inlet/outlet module 220, and a storing module 210. Optionally, the autonomous base 200 may include a support module 206 configured to support the control module, the inlet/outlet module, and the storing module, for example, when the base is located on the deck or if the base is landing on the ocean bottom, or even floating. The autonomous base may handle the launching or recovery of the AUVs simultaneously or sequentially. Control module 230 is shown to include the controller 260 and the acoustic system 232. The controller and acoustic system of the autonomous base may be similar to those described in FIG. 3.

The inlet/outlet module 220 may have a functionality for detecting that an AUV has entered the base and also for instructing the AUVs to switch off their propulsion systems. In this way, after an AUV enters through the inlet/outlet module 220 (which is the gate to the storing module 210), (i.e., unassisted) into the storing part 210 as its propulsion system is shut off. This is advantageous for conserving the energy left in its battery and also for preventing the AUV from escaping the storing module. Alternatively, for neutrally buoyant AUVs, assistance might be provided for ensuring the AUVs remain inside the basket after entering, with a non return system, e.g., a curtain or a double swinging door 221 (FIG. 7B shows such a curtain or door only partially covering the inlet/outlet module 220; however, if such an element is provided for maintaining the AUVs inside the storing module 210, the curtain or double swinging door 221 would extend all around the inlet/outlet module 220), which could be entered through because of the speed of the AUVs. Such element will stop the exit of floating AUVs. For shutting off the propulsion system of the AUVs, as illustrated in FIG. 7B, the inlet/outlet module 220 may have an AUV interface 222 that is configured to detect the entrance on an AUV and also to identify the AUV. In one application, each AUV has a unique identification ID which may be detected by the AUV interface 222. For example, AUV interface 222 includes an acoustic modem that interrogates the AUV about its ID. After the ID is checked against, for example, a table stored in the memory of the controller 260, AUV interface 222 instructs the AUV to shut down its propulsion system. In one embodiment, the instruction to shut the propulsion system is sent after a predetermined amount of time to make sure that the AUV has entered the storing part. In one application, the AUV's controller makes the decision to shut down its propulsion system after colliding with the base. The storing module 210 may be simply a chamber for receiving the recovered AUVs or a basket.

Figure 8:
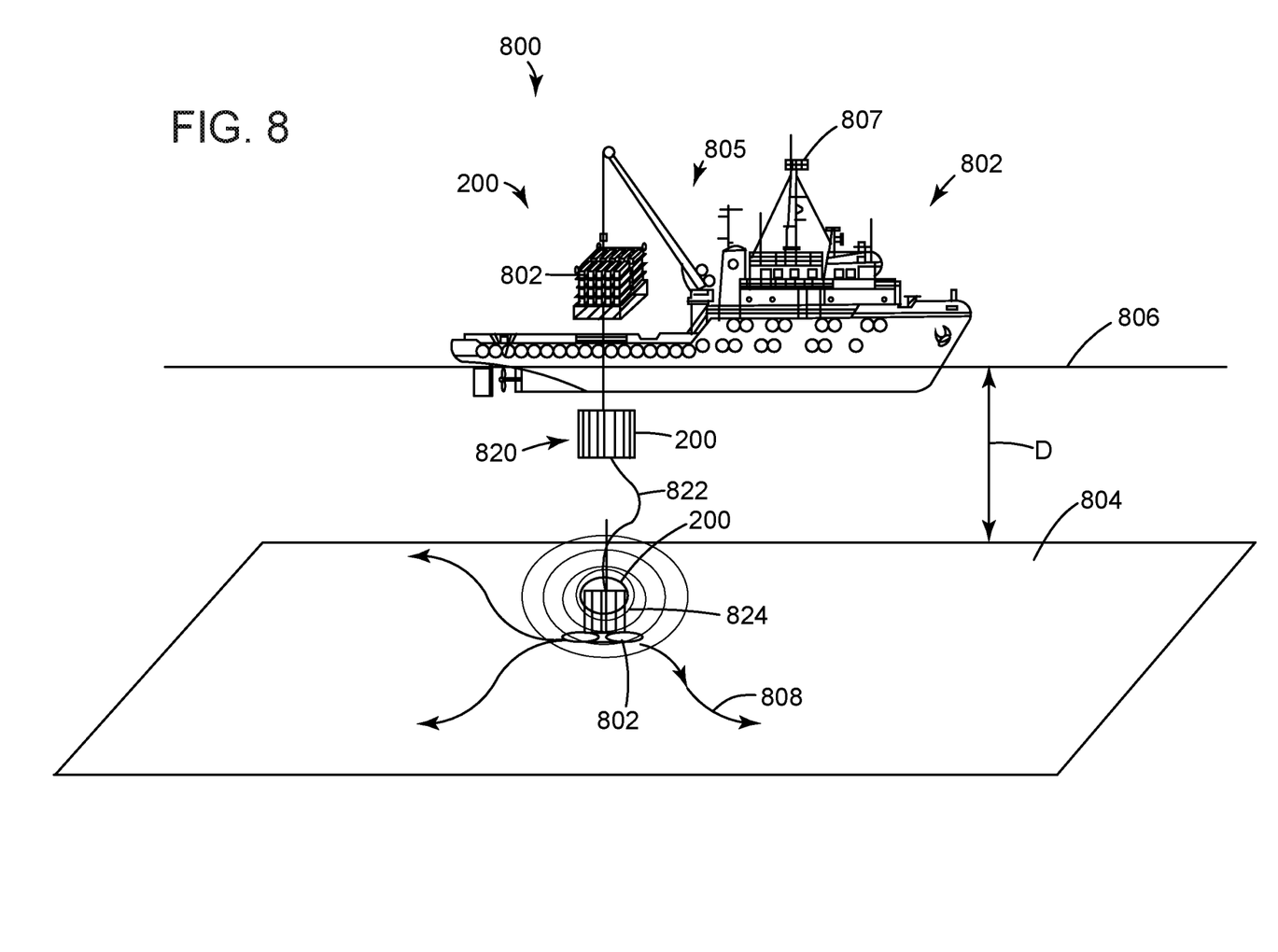
FIG. 8 illustrates a vessel that launches/retrieves an autonomous underwater base with a crane.
Figure 9:
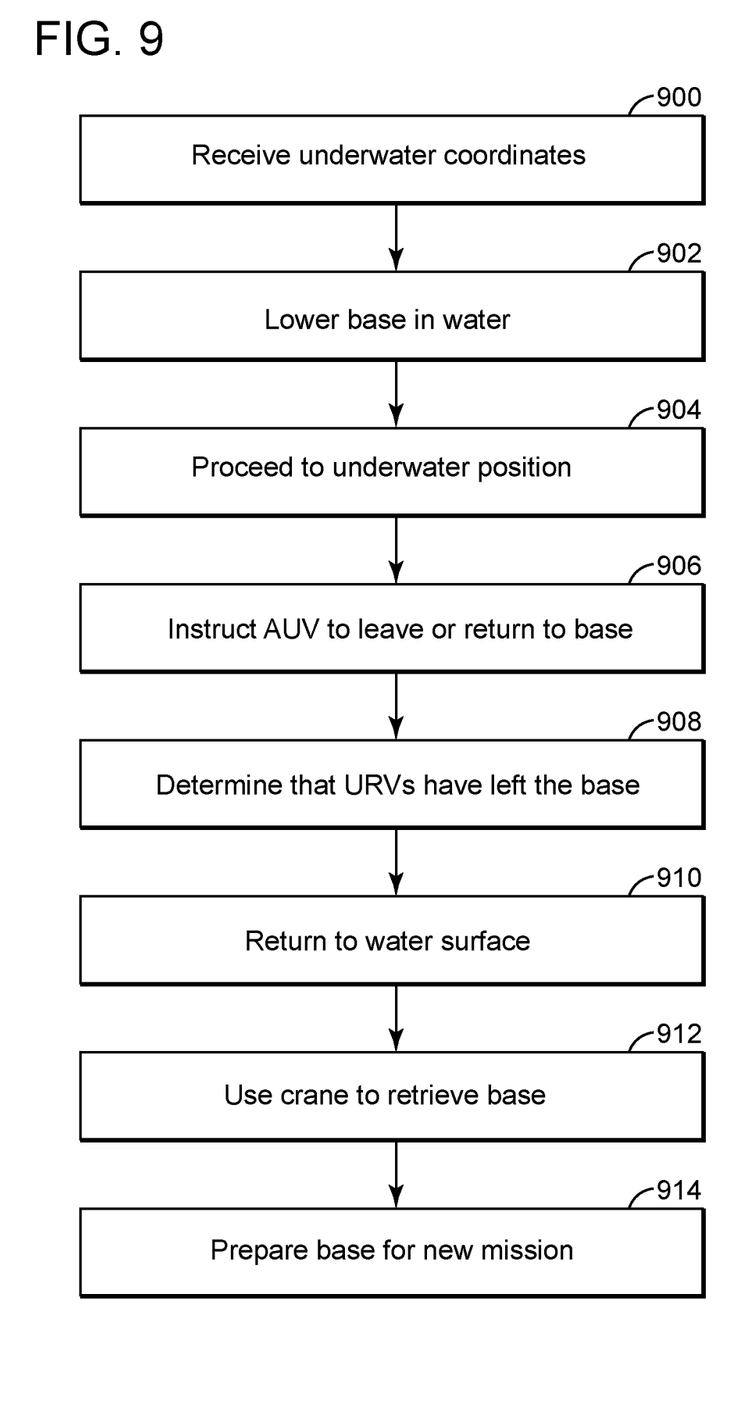
FIG. 9 is a flowchart of a method for deploying/retrieving an autonomous base from water.

A method for deploying the autonomous base and launching/recovering the corresponding AUVs is now discussed with reference to FIGS. 8 and 9. FIG. 8 illustrates a seismic survey system 800 including a vessel 802 and at least one autonomous base 200. Autonomous base 200 is shown being loaded with plural AUVs 802. Note that the base may be scaled to carry any number of AUVs and a vessel may be selected to carry any number of bases. A crane 805, which may be heave compensated or not, may handle autonomous base 200. At its initial position on the deck (which position may be calculated by the GPS 807 of the vessel 802), as illustrated in step 900 of FIG. 9, the autonomous base 200 receives its final underwater coordinates (x,y,z), for example, from the operator of the vessel. The underwater coordinates (x,y,z) are likely to lay in a plane 804, located at a certain depth D from the water surface 806. Depth D may be in the range of 1 to 100 m. Those skilled in the art would know to use the autonomous base 200 with other depths.

In step 902, the autonomous base 200 is lowered by crane 805 in the water, and released at a first position 820, at the water surface or close to it. In step 904, the autonomous base 200 activates its positioning system 240 (see FIG. 2) and moves along a path 822 to a second position 824, which may be the final underwater position (x,y,z). Note that this step is performed in an autonomous way, i.e., there is no necessary physical link between the vessel and the base to assist the base in reaching its final destination. The base may receive information during this step from the vessel, the autonomous base 200 may communicate with the vessel 802 via the communication system 290 for determining its underwater position. After the correct depth and x,y position in the plane 804 have been achieved by the base 200 on its own (with no assistance from the crane), autonomous base 200 instructs in step 906 the AUVs 802 to deploy. If the base 200 is used to retrieve the already deployed AUVs, then during this step the base 200 or vessel 802 sends a signal to the AUVs to proceed to the base. The base uses during this step its positioning system to maintained the desired position x,y,z, so that the AUVs have a fixed reference point to which to return.

Returning to the scenario in which the base launches the AUVs, the AUVs 802 leave the base 200 and follow their own paths 808 to arrive at their desired underwater locations. AUVs 802 may communicate with the autonomous base 200 while navigating to their desired underwater locations and use the acoustic system 232 of the base and/or the acoustic system of the vessel as a reference system.

After the AUVs have been deployed, which is envision to take no longer than 10 to 30 minutes, the autonomous base 200 makes in step 908 a determination that the required AUVs have left the storing module (e.g., by using the AUVs interface 222 (or a camera system) and in step 910 the base 200 activates the positioning system 240 to bring the base back to the water surface. Note that during this step, the node autonomously (i.e., with no help from the vessel) uses its positioning system to surface to a desired position. During this step, the vessel monitors the location of the base so that the vessel can move to the desired position to meet the base. Also note that the positioning system may be engaged during step 906, when the AUVs are deployed or retrieved, so that the base substantially act as a fixed point for the AUVs and the AUVs can calculate their trajectories relative to this fix point.

When the autonomous base 200 is at the water surface 806 or close to it, crane 805 is activated in step 912, from the vessel, to connect to the lasso or hook 504 (discussed in FIGS. 5 and 6) and to bring the autonomous base 200 back onto the deck of the vessel 802. Then, in optional step 914, the power system 250 is recharged and new instructions are downloaded to the controller 260 via port 266 (see FIG. 3) to prepare the base for a new mission.

Figure 10:
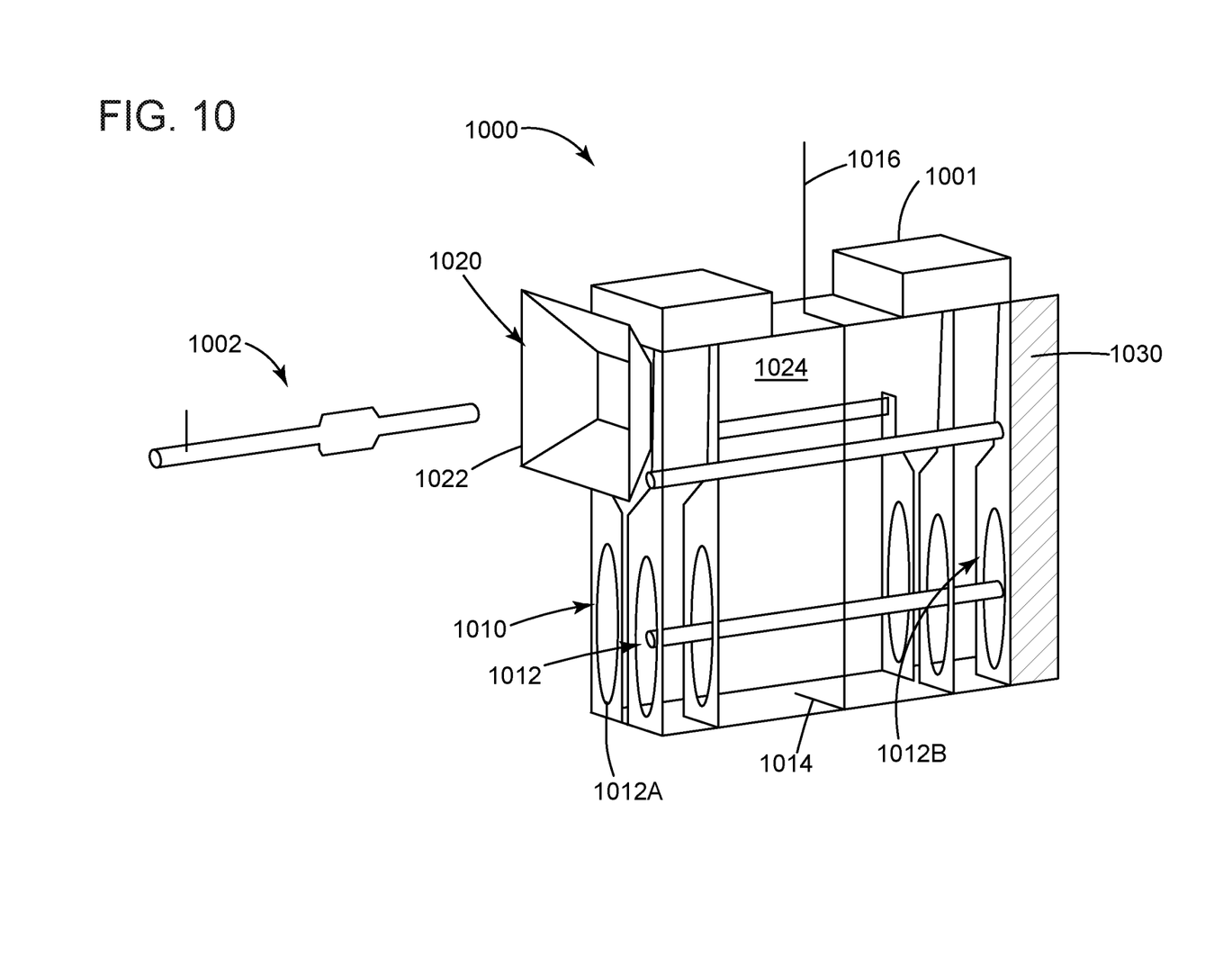
FIG. 10 illustrates an autonomous underwater base capable of launching/retrieving AUVs.

According to another embodiment illustrated in FIG. 10 and alternative to FIG. 2, a base 1000 may be configured to have a storing module 1010, an inlet module 1020, and optionally, a control module 1030. The inlet module 1020 may include a funnel 1022 for receiving the AUVs 1002. In one application, the funnel 1022 may have a pyramidal shape as illustrated in the figure. However, one skilled in the art would understand that other shapes may be used as long as the distal part (the part closest to an approaching AUV 102) is as wide as possible to compensate for relative motions of the AUV with respect to the base. In one application, the outlet part of the funnel 1022 is slightly larger (along the width and height) than the AUV's dimensions to center vertically and laterally each incoming AUV.

The inlet module 1020 may also include a tunnel part 1024, that is connected to the outlet of the funnel 1022, as shown in the figure. The tunnel part 1024 may be a rectangular cuboid or a tetrahedron that fluidly communicates with the funnel 1022 to receive the AUV 1002. A bottom side of the tunnel part 1024 is open and fluidly communicates with the storing module 1010. In this way, the AUV 1002, after entering the tunnel part 1024 (note that a length of the tunnel part is longer than a length of the AUV), is aligned with the storing module 1010.

The storing module 1010 may include one or more racks 1012 configured to receive the AUVs entering the tunnel part 1024. Rack 1012 may have two rails (or guides) 1012A and 1012B, one located at one side of the storing module 1010 and the other one at the other side. In this way, the AUV 1002 has both its head and tail engaged with the rack 1012 and aligned inside the storing module 1010. Storing module 1010 may be provided with a bottom door 1014 for holding the AUVs inside. When a decision is made to release the AUVs from the base, the bottom door 1014 may be opened, either as instructed by control module 1030, or with the help of a rope 1016. Floats 1001 may be located on the base 1000. Control module 1030 may be attached to any side of the base 1000 and may have a configuration similar to control module 230.

According to this embodiment, an AUV recovery takes place as follows. The AUV approaches the base, when instructed by the base, support vessel or an internal memory. The AUV position itself in front of the funnel part using, for example, the acoustic guidance system and/or the homing acoustic guidance system. Then, the AUV moves into the funnel part and then into the tunnel part. The AUV moves into the tunnel part until the end of the tunnel part is reached. At this point, the AUV itself or the base instructs the AUV to use the ballast mechanism (discussed above) or the vertical propulsion mechanism to increase its weight, so that the AUV "sinks" into the storing part 1010. At this time, the AUV engages the rails 1012 is moves toward the bottom of the storing part. Other AUVs may already be located inside the base. As the AUV has been stored, another AUV may now enter the base, similar to the procedure described above. Plural AUVs may be stored by the rails of the storing part. One skilled in the art would understand that plural rails may be present for storing various stacks of AUVs. When the time to release the AUVs come, the bottom door 1014 is opened to release them. The bottom gate may be opened from the surface, for example, with rope 1016 or automatically by control module 1030. When the bottom door opens, the AUVs either fall out of the base due to the gravity, or they may activate their ballast mechanism or vertical propulsion system.

An advantage of this embodiment is the fact that the AUV are stored in well-defined positions, which guarantees that they will not move during the recovery of the base, and also they will not apply an excess pressure on fragile parts of the other AUVs. Further, due to their predefined positions, the AUVs can easily be extracted one by one from the base, even using automated means, e.g., a robotic arm, and in a controlled and safe manner.

One or more of the exemplary embodiments discussed above disclose an autonomous base and methods for deploying/recovering AUVs during or after a seismic survey. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. An autonomous underwater base for deploying and retrieving autonomous underwater vehicles, AUVs, equipped with seismic sensors for recording seismic signals during a marine seismic survey, the autonomous underwater base comprising:
   a storing module configured to store the AUVs;
   an inlet/outlet module configured to control access of the AUVs inside the storing module; and
   a control module having a positioning system configured to adjust a position of the base in water,
   wherein the positioning system autonomously drives the storing module from a first position to a second position underwater.

2. The base of claim 1, wherein the positioning system comprises:
   a depth control mechanism configured to control a depth of the storing module; and
   a lateral positioning mechanism configured to control a lateral displacement of the storing module, wherein the lateral displacement is perpendicular to the depth.

3. The base of claim 2, wherein the depth control mechanism is a ballast mechanism.

4. The base of claim 2, wherein the depth control mechanism includes at least one tunnel thruster located in a tunnel extending through a body of the control module.

5. The base of claim 2, wherein the lateral positioning mechanism includes at least one tunnel thruster located in a tunnel extending through a body of the control module.

6. The base of claim 1, wherein the control module comprises:
   an acoustic system for guiding the AUVs toward the inlet/outlet module.

7. The base of claim 6, wherein the control module further comprises:
   a controller configured to control the depth control mechanism, the lateral positioning mechanism, and the acoustic system.

8. The base of claim 7, wherein the control module further comprises:
   a power system configured to provide energy; and
   a communication system configured to exchange information with a vessel.

9. The base of claim 1, further comprising:
   one or more ropes attached to the control module; and
   a float attached to the one or more ropes.

10. The base of claim 1, wherein the inlet/outlet module comprises:
    a funnel part for receiving the AUV; and
    a tunnel part connected to the funnel part and configured to guide the AUV to the storing module.

11. The base of claim 10, wherein the storing module comprises:
    rails for sorting the AUVs.

12. An autonomous underwater base for deploying/retrieving autonomous underwater vehicles, AUVs, the autonomous underwater base comprising:
    a body configured to store the AUVs;
    an acoustic system for guiding the AUVs toward the body;
    a positioning system formed within the body and configured to adjust a position of the base in water; and
    a controller connected to the positioning system and configured to control the positioning system,
    wherein the positioning system autonomously drives the base from a first position to a second position underwater.

13. The base of claim 12, wherein the positioning system comprises:
    a depth control mechanism configured to control a depth of the base; and
    a lateral positioning mechanism configured to control a lateral displacement of the base, wherein the lateral displacement is perpendicular to the depth.

14. The base of claim 13, wherein the depth control mechanism includes at least one tunnel thruster located in a first tunnel extending through the body, and
    wherein the lateral positioning mechanism includes at least one tunnel thruster located in a second tunnel extending through the body, the first tunnel being perpendicular on the second tunnel.

15. The base of claim 12, wherein the body comprises:
    a funnel part for receiving the AUVs; and
    a tunnel part connected to the funnel part and configured to guide the AUVs to a storing module.

16. The base of claim 15, wherein the storing module comprises:
    rails for sorting the AUVs.

17. The base of claim 12, wherein the base further comprises:
    a power system configured to provide energy; and
    a communication system configured to exchange information with a vessel.

18. A method for launching/retrieving autonomous underwater vehicles, AUVs, equipped with seismic sensors for collecting seismic data, the method comprising:
    downloading an underwater position to an autonomous base while on board of a vessel;

lowering the autonomous base at a first position in water, from the vessel, and disconnecting the autonomous base from the vessel so that there is no mechanical link between the autonomous base and the vessel;

autonomously driving the autonomous base from the first position to the underwater position;

launching or retrieving the AUVs at the autonomous base at the underwater position, wherein the autonomous base uses an acoustic system for guiding the AUVs; and autonomously returning the autonomous base to a water surface.

19. The method of claim 18, wherein the step of lowering further comprises:

lowering with a crane the autonomous base in the water.

20. The method of claim 18, wherein the autonomous base moves underwater unassisted by the vessel.

* * * * *